United States Patent
Heebner et al.

(10) Patent No.: US 9,450,373 B2
(45) Date of Patent: Sep. 20, 2016

(54) APPARATUS AND METHOD FOR ENABLING QUANTUM-DEFECT-LIMITED CONVERSION EFFICIENCY IN CLADDING-PUMPED RAMAN FIBER LASERS

(75) Inventors: John E. Heebner, Livermore, CA (US); Arun K. Sridharan, Fremont, CA (US); Jay Walter Dawson, Livermore, CA (US); Michael J. Messerly, Danville, CA (US); Paul H. Pax, Hayward, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 980 days.

(21) Appl. No.: 12/718,179

(22) Filed: Mar. 5, 2010

(65) Prior Publication Data

US 2011/0170563 A1   Jul. 14, 2011

Related U.S. Application Data

(60) Provisional application No. 61/157,631, filed on Mar. 5, 2009.

(51) Int. Cl.
*G02B 6/00* (2006.01)
*H01S 3/30* (2006.01)
*H01S 3/067* (2006.01)
*H01S 3/094* (2006.01)

(52) U.S. Cl.
CPC ............... *H01S 3/302* (2013.01); *H01S 3/067* (2013.01); *H01S 3/0675* (2013.01); *H01S 3/06708* (2013.01); *H01S 3/094007* (2013.01)

(58) Field of Classification Search
CPC ....................................................... G02B 6/00

USPC ............................................................. 385/122
See application file for complete search history.

(56) References Cited

U.S. PATENT DOCUMENTS

| | | | |
|---|---|---|---|
| 6,363,087 B1 | 3/2002 | Rice | |
| 6,563,995 B2* | 5/2003 | Keaton et al. | 385/127 |
| 6,603,909 B2* | 8/2003 | Varner | 385/123 |
| 6,876,490 B2* | 4/2005 | Kane et al. | 359/341.1 |
| 6,909,538 B2* | 6/2005 | Arbore et al. | 359/341.1 |
| 6,970,631 B2* | 11/2005 | Arbore | 385/123 |
| 6,987,783 B2* | 1/2006 | Fajardo et al. | 372/6 |
| 7,034,992 B2 | 4/2006 | Komine | |
| 7,039,076 B2* | 5/2006 | Kane et al. | 372/6 |
| 7,952,719 B2* | 5/2011 | Brennan, III | 356/479 |
| 2002/0081086 A1* | 6/2002 | Varner | 385/123 |
| 2002/0159736 A1* | 10/2002 | Dejneka et al. | 385/127 |
| 2002/0172485 A1* | 11/2002 | Keaton et al. | 385/127 |

(Continued)

OTHER PUBLICATIONS

Carter, A., et al., "New technology advances applications for high-power fiber lasers", Military & Aerospace Electronics, vol. 16, No. 2, 2005, 9 pp. http://mae.pennnet.com/Articles/Article_Display.cfm?Section=Articles&Subsection=Display&ARTICLE_ID=222014.

(Continued)

*Primary Examiner* — Kaveh C Kianni
(74) *Attorney, Agent, or Firm* — John P. Wooldridge

(57) ABSTRACT

Cladding-pumped Raman fiber lasers and amplifiers provide high-efficiency conversion efficiency at high brightness enhancement. Differential loss is applied to both single-pass configurations appropriate for pulsed amplification and laser oscillator configurations applied to high average power cw source generation.

40 Claims, 13 Drawing Sheets

(56) References Cited

U.S. PATENT DOCUMENTS

| | | | |
|---|---|---|---|
| 2003/0169488 A1* | 9/2003 | Arbore et al. | 359/341.4 |
| 2003/0228118 A1* | 12/2003 | Arbore | 385/123 |
| 2003/0234977 A1* | 12/2003 | Kane et al. | 359/341.3 |
| 2004/0052278 A1* | 3/2004 | Kane et al. | 372/25 |
| 2004/0233941 A1* | 11/2004 | Fajardo et al. | 372/6 |
| 2004/0258377 A1* | 12/2004 | Berkey et al. | 385/123 |
| 2005/0024716 A1 | 2/2005 | Nilsson et al. | |
| 2007/0229939 A1* | 10/2007 | Brown et al. | 359/341.1 |

OTHER PUBLICATIONS

Codemard, C.A., et al., "Cladding-pumped Raman fiber amplifier for high-gain, high-energy single-stage amplification", OSA/OFC, 2005, 3 pp.

Codemard, C.A., et al., "High-power continuous-wave cladding-pumped Raman fiber laser", Optics Letters, vol. 31, No. 15, 2006, pp. 2290-2292.

Codemard, C.A., et al., "High-brightness, pulsed, cladding-pumped Raman fiber source at 1660 nm", Conference on Lasers and Electro-Optics, 2007, pp. 1407-1408.

Holmes, M.J., et al., "Optimisation of refractive index profile for high gain fibre amplifiers", Electronics Letters, vol. 26, No. 22, 1990, pp. 1873-1874.

Jeong, Y., et al., "Cladding-pumped ytterbium-doped large-core fiber laser with 610 W of output power", Optics Communications, 234, 2004, pp. 315-319.

Kim, J., et al., "Suppression of stimulated Raman scattering in a high power Yb-doped fiber amplifier using a W-type core with fundamental mode cut-off." Optics Express, vol. 14, No. 12, 2006, pp. 5103-5113.

Likhachev, M., et al., "Depressed Core Bragg Waveguides: Experiment and Simulation", IEEE, ICTON 2004, We.B2.1, pp. 117-120.

Limped, J., et al., "The Rising Power of Fiber Lasers and Amplifiers", IEEE Journal of Selected Topics in Quantum Electronics, vol. 13, No. 3, 2007, pp. 537-545.

Soh, Daniel B.S., et al., "Neodymium-Doped Cladding-Pumped Aluminosilicate Fiber Laser tunable in the 0.9-μm Wavelength Range", IEEE Journal of Quantum Electronics, vol. 40, No. 9, 2004, pp. 1275-1282.

* cited by examiner

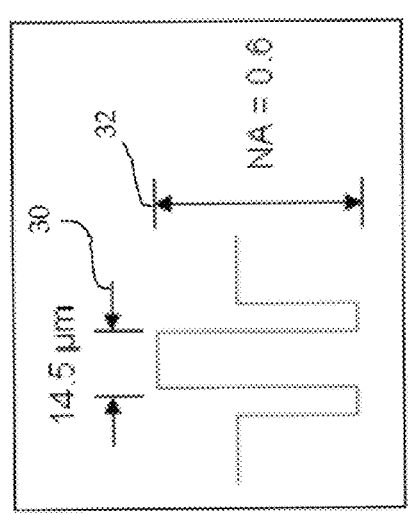
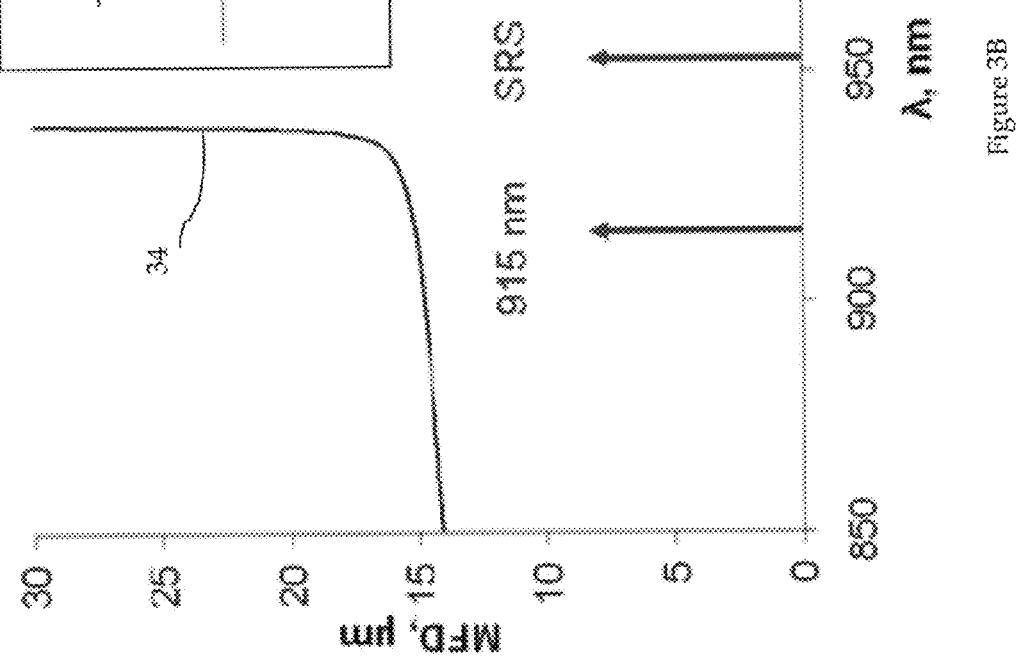
Figure 3A
Figure 3B

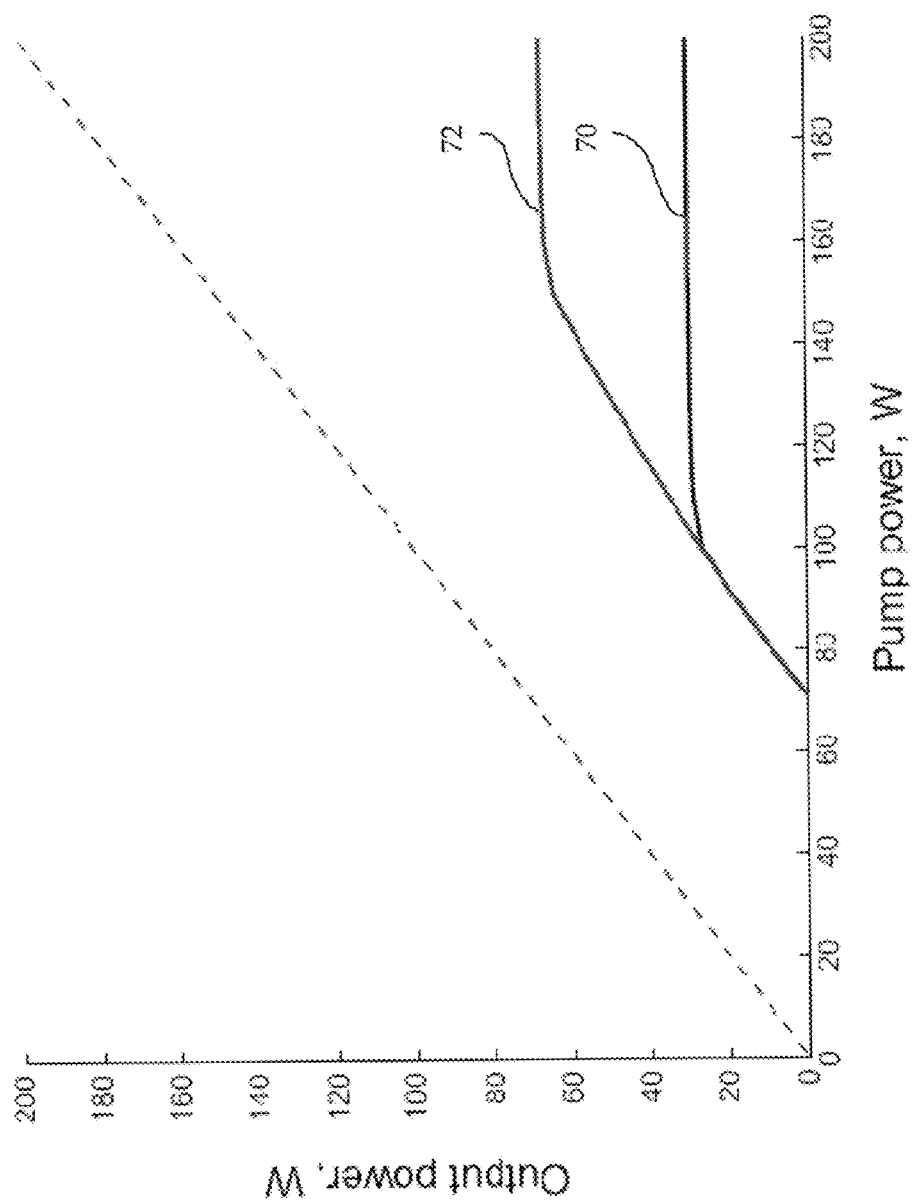

APPARATUS AND METHOD FOR ENABLING QUANTUM-DEFECT-LIMITED CONVERSION EFFICIENCY IN CLADDING-PUMPED RAMAN FIBER LASERS

CROSS-REFERENCE TO RELATED APPLICATIONS

This application claims the benefit of U.S. Provisional Patent Application No. 61/157,631 titled "Method For Enabling Quantum-Defect-Limited Conversion Efficiency In Cladding-Pumped Raman Fiber Lasers," filed Mar. 5, 2009, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC.

BACKGROUND OF THE INVENTION

1. Field of the Invention

The present invention relates to fiber lasers, and more specifically, it relates to cladding-pumped Raman fiber lasers.

2. Description of Related Art

Many scientific and industrial applications require laser sources that generate mJ-class, 1-30 ns pulses with diffraction limited transverse mode quality. Q-switched oscillators and the master oscillator power amplifier (MOPA) based on crystalline and ceramic gain media are the two traditional approaches to meeting these laser requirements. Since surface damage is one of the key limits to pulse energy scaling, the aperture of these bulk crystals is increased to ensure that the fluence of the pulses remains below damage levels. With careful design, these systems can be engineered to operate close to diffraction limited beam quality. However, maintaining good beam quality as the system is scaled in average power remains a challenge.

On the other hand, fiber lasers and amplifiers can guide a single transverse mode and can potentially obviate the need to make tradeoffs between beam quality and output power. To achieve high pulse energy output from fibers, the core diameter needs to be increased while reducing the numerical aperture (NA) to ensure that only a single transverse mode is guided. Achieving this in traditional large mode area (LMA) fibers poses a manufacturing challenge as very tight tolerances on the index of refraction across the core diameter are required. Photonic crystal (PC) fibers are an alternative means to scale the core diameter while keeping a small core NA. LMA or PC fibers with large core-diameters and long lengths must be bent in order to achieve a compact setup. Bending the fibers causes losses for the higher order modes, reduces the mode field diameter, and therefore reduces the extractable pulse energy. Further, pulse energy scaling with good beam quality has been difficult because long fiber lengths, combined with tightly confined modes with high peak powers, trigger the onset of nonlinear effects like stimulated Brillouin scattering (SBS) and stimulated Raman scattering (SRS).

SUMMARY OF THE INVENTION

Cladding-pumped Raman fiber lasers and amplifiers operate in unexplored parameter space with high conversion efficiency (>65%) and high brightness enhancement (>1000). Fibers with large clad-to-core diameter ratios provide a means for Raman-based brightness enhancement of diode pump sources. Unfortunately, the diameter ratio cannot be extended indefinitely since the intensity generated in the core can greatly exceed that in the cladding long before the pump is fully depleted. If left uncontrolled, this leads to the generation of parasitic second-order Stokes wavelengths in the core limiting the conversion efficiency and clamping the achievable brightness enhancement. Using a coupled-wave formalism, we present the upper limit on conversion efficiency as a function of diameter ratio for conventionally guided fibers. We further present strategies for overcoming this limit based upon depressed well core designs. We consider 2 configurations: 1) pulsed cladding-pumped Raman fiber amplifier (CPRFA) and 2) cw cladding-pumped Raman fiber laser (CPRFL).

BRIEF DESCRIPTION OF THE DRAWINGS

The accompanying drawings, which are incorporated into and form a part of the disclosure, illustrate embodiments of the invention and, together with the description, serve to explain the principles of the invention.

FIG. 3A is a depressed well core design.

FIG. 3B plots low loss at the first-order Stokes signal wavelength and high loss at the second-order Stokes parasitic wavelength for the design of FIG. 3A.

FIGS. 9A and 9B shows power input output relationships for 100 m and 250 m cladding-pumped Raman fiber lasers with 94% and 19% reflectivities for $\alpha_{s2}$=2.5 dB/m, respectively.

DETAILED DESCRIPTION OF THE INVENTION

Figure 1:
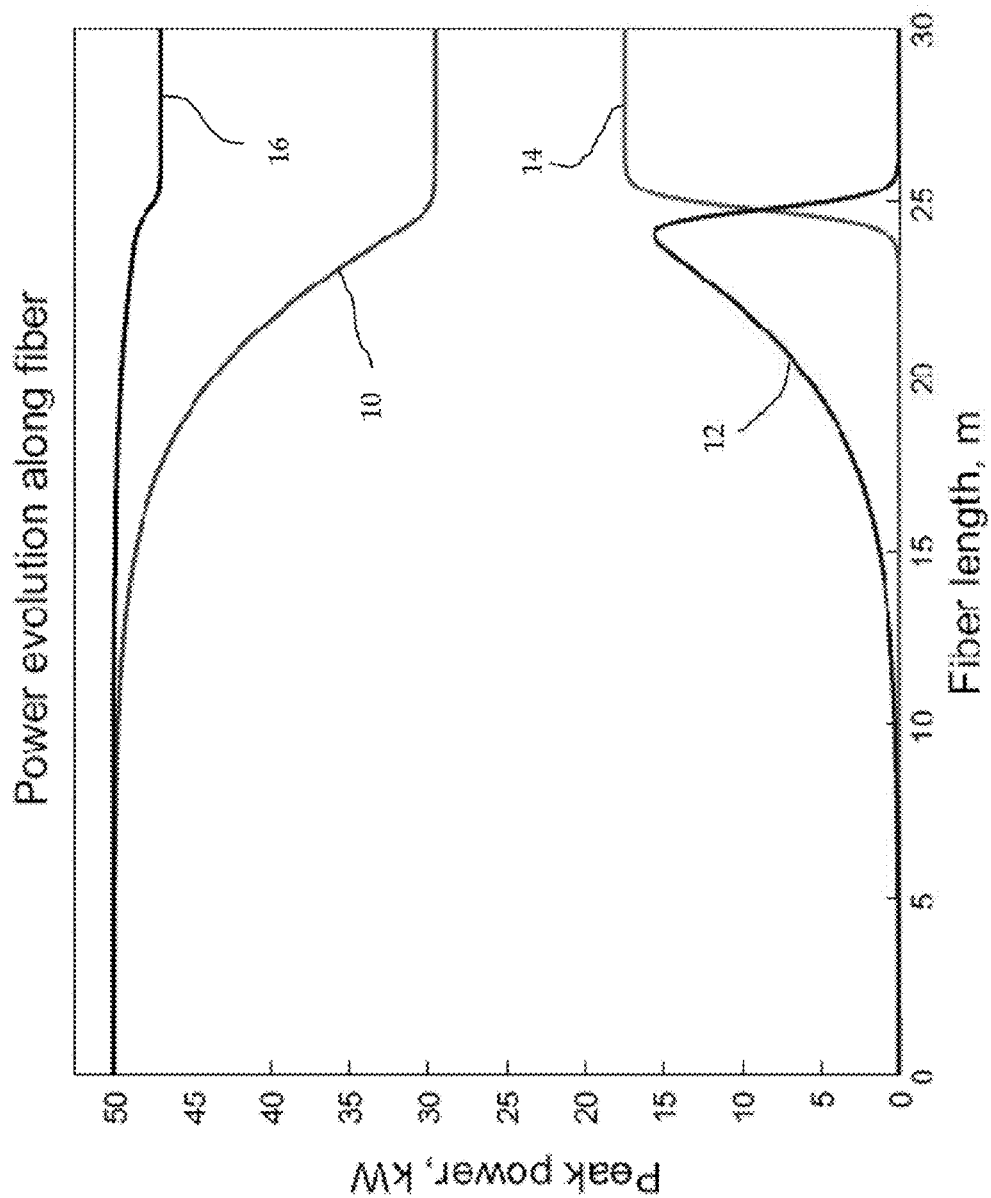
FIG. 1 shows a simulation of a pulsed cladding-pumped Raman amplifier with a single-pass evolution of pump, first order Stokes and higher-order Stokes powers versus propagation length.

High average power fiber amplifiers and fiber laser oscillators are important candidates for directed energy laser sources, front-end drive laser sources for Inertial Confinement Fusion (ICF), short pulse, compact high flux X-ray sources, and machining. Generally, these are pumped by diode lasers, which are very efficient devices for converting electrical energy to optical energy. At high powers, pump beam quality becomes difficult to achieve. Cladding-pumped fiber lasers provide a means for converting that energy into a diffraction-limited beam in a process referred to as brightness enhancement. To date, Yb3+ fiber lasers have proven to be the best systems for achieving brightness enhancement. However, rare-earth doped fibers emit in fixed spectral bands and require that the diode laser emission spectrum overlap with their absorption band. The present invention provides alternative methods and apparatuses for converting low brightness pump diode laser energy into a high brightness, diffraction-limited beam with high efficiency using cladding-pumped Raman fiber amplification (CPRFA) [4]. Until the present invention, conversion with high efficiency [1] and high brightness enhancement [2] have not been simultaneously demonstrated.

At very high powers and/or energies, the present cladding-pumped Raman fiber amplifiers possess multiple advantages when compared to rare-earth doped fiber laser amplifiers. These advantages include 1) the potential for higher quantum-defect-limited conversion efficiency, 2) lower heat dissipation, 3) a wider range of operating wavelengths since the Raman gain bandwidth is determined by a fixed frequency offset from the pump source and spans many THz, 4) scaling to wide bandwidths using composite gain composed of staggered pumps [3], 5) simplicity of fabrication since the Raman gain media does not require dopants beyond those originally developed for mature passive fiber manufacturing processes, 6) avoidance of photodarkening, 7) operation at higher bulk damage thresholds, 8) scaling to larger single-mode core diameters since the elimination of rare-earth dopants permits larger core sizes to be employed with good or even single mode beam quality due to superior refractive index control in non rare-earth doped fibers, and 9) multi-stage scaling by coherent combination, since a cladding pumped Raman laser would essentially provide a means to coherently combined the output of many fiber lasers in a simple and robust manner.

We present methods for designing and optimizing cladding-pumped Raman fiber amplifiers and laser oscillators. We show that the use of differential optical waveguide loss can suppress higher order Stokes conversion and greatly enhances the utility of a cladding pumped Raman fiber amplifier or laser. It does so by significantly raising the clad-to-core diameter ratio at which the process can be efficient. This in turn greatly increases the allowable brightness enhancement of the laser or amplifier. Commercial, off-the-shelf low brightness laser diodes can thus be used for high brightness, high efficiency, high energy and/or high power lasers.

Consider the case of a single-pass cladding-pumped Raman amplifier. The coupled wave equations governing the interaction of pump $P_p$, desired first-order Stokes $P_{s1}$, and undesired second-order Stokes $P_{s2}$ powers are given as [5]:

$$\frac{dP_p}{dz} = -\alpha_p P_p - \frac{g}{A_{clad}} \frac{V_p}{V_{s1}} P_{s1} P_p \quad (1)$$

$$\frac{dP_{s1}}{dz} = -\alpha_{s1} P_{s1} + \frac{g}{A_{clad}} \frac{V_{s1}}{V_{s2}} P_p P_{s1} - \frac{g}{A_{core}} P_{s2} P_{s1} \quad (2)$$

-continued $$\frac{dP_{s2}}{dz} = -\alpha_{s2} P_{s2} + \frac{g}{A_{core}} \frac{V_{s2}}{V_{s3}} P_{s1} P_{s2} - \frac{g}{A_{core}} P_{s3} P_{s2} \quad (3)$$

where $A_{clad}$ and $A_{core}$ are the respective cladding and core effective areas, $V_j$ are the interacting carrier frequencies, $\alpha_j$ are the losses and g is the Raman gain coefficient. Compared to core-pumped Raman amplifiers, gain at the first-order Stokes order is lower by the ratio of the clad to core areas. However, the subsequent conversion of light in the core to higher Stokes orders continues at the higher gains. A race then ensues between pump depletion and second order Stokes conversion. Except for very small clad-to core areas, this race is usually won by the higher gain at the second-order Stokes, wiping out the first-order Stokes before the pump has had a chance to fully deplete. This incomplete conversion is the primary drawback for cladding pumped Raman amplification. A solution of these equations is plotted in FIG. 1, which shows a simulation of a pulsed cladding-pumped Raman amplifier with a single-pass evolution of pump 10, first order Stokes 12 and higher-order Stokes 14 powers versus propagation length. Here, at a clad-to-core diameter ratio of 125:20, and NA ratio of 0.45:0.07, the conversion efficiency is limited to about 30% before the first-order Stokes power in the core is rapidly dissipated into second-order Stokes. Total power 16 is also shown. Apart from the quantum defect losses incurred at each conversion responsible for the downward steps in the total power, the system is assumed to be lossless.

Assuming conversion from a multimode cladding to a single mode core with a beam quality parameter of $M^2=1$, the brightness enhancement is defined as [2]:

$$B = \eta (\pi NA_{clad} D_{clad} / 2\lambda_s)^2. \quad (4)$$

Note that this expression depends on the conversion efficiency, $\eta$, and the limitations imposed by radiance considerations. Increasing the clad-to-core diameter ratio can initially improve this quantity but it becomes increasingly difficult to attain a high level of conversion efficiency before the onset of second-order Stokes. To quantify the relationship between the conversion efficiency limited by the sudden initiation of second-order Stokes, a simple analytic expression can be derived that predicts the attainable conversion efficiency as a function of clad-to-core diameter ratio.

The conversion efficiency is defined herein as $\eta(z)=P_{s1}(z)/P_p(0)$. Because second-order Stokes generation is not appreciably large at the peak of first-order Stokes generation, and assuming all other loss mechanisms are negligible, by energy conservation we have:

$$P_p(0) \approx P_p(z_{pk}) = P_{s1}(z_{pk}). \quad (5)$$

The peak conversion efficiency can thus be estimated from the following relation:

$$\eta_{pk} \approx \frac{1}{1 + P_p(z_{pk})/P_{s1}(z_{pk})}. \quad (6)$$

This relation, however, is not directly useful unless we further link the peak signal power to the second order stokes seed which ultimately arrests the achievable conversion. This is complicated because near the peak, the signal intensity is being amplified by the pump while it is in turn amplifying the second-order Stokes. In order to simplify this dependence, we approximate, using an effective gIL product, the super-exponentially growing second-order Stokes power as simple exponential growth, as follows:

$$P_{s2}(z_{pk}) \approx P_{s2}(0)e^{gIL_{eff}} \quad (7)$$

where the effective gIL producet [6] can be approximated as:

$$gIL_{eff} = g\int dz I_{s1}(0)e^{gI_p(z)z} \approx g\int dz I_{s1}(z_{pk})e^{gI_p(z_{pk})(z-z_{pk})} \quad (8)$$

$$= I_{s1}(z_{pk})/I_p(z_{pk})[1 - e^{-gI_p(z_{pk})z_{pk}}] \quad (9)$$

$$\approx (A_{clad}/A_{core})(P_{s1}(z_{pk})/P_p(z_{pk})). \quad (10)$$

Combining eqns. 7 and 10 results in an expression linking the peak signal power to the second order stokes seed:

$$P_{s1}(z_{pk}) = P_p(z_{pk})(A_{core}/A_{clad})\ln(P_{s2s})(z_{pk})/P_{s2}(0)). \quad (11)$$

We make use of the fact that the rate of first-order Stokes generation goes to zero at the peak of first-order Stokes generation. For simplicity we assume the quantum defect is small $\nu_{s1} \approx \nu_{s2}$ and the signal absorption is much weaker than the Raman signal gain $\alpha_{s1} \ll gI_p$, as follows:

$$\frac{dP_{s1}}{dz} \approx \frac{g}{A_{clad}}P_pP_{s1} - \frac{g}{A_{core}}P_{s2}P_{s1} = 0. \quad (12)$$

This yields an expression connecting the second-order Stokes power to the depleted pump power:

$$P_{s2}(z_{pk}) \approx \frac{A_{core}}{A_{clad}}P_p(z_{pk}). \quad (13)$$

Substituting eqns. 11 and 13 into eqn. 6 yields an analytic expression for the peak achievable conversion efficiency:

$$\eta_{pk} \approx \frac{1}{1 + \frac{A_{clad}}{A_{core}}/\ln\left(\frac{A_{core}}{A_{clad}}\frac{P_p(z_{pk})}{P_{s2}(0)}\right)}. \quad (14)$$

Increasing the pump and decreasing the fiber length does not help, resulting in an upper bound of $I_s \approx 8I_p$ at 90% conversion [7]. In the limit of a large clad-to-core diameter ratio, and for typical assumptions regarding the second-order Stokes seed, the conversion efficiency can be approximated as:

$$\eta \rightarrow 10(D_{clad}/D_{core})^{-2}. \quad (15)$$

Because the conversion efficiency is inversely proportional to the clad-to-core area, it will directly cancel the other component of the brightness enhancement, limited by radiance considerations (directly proportional to the clad-to-core area). Combining eqns. 4 and 15, the maximum achievable brightness enhancement is clamped at:

$$B_{stokeslimited} \rightarrow 10(\pi NA_{clad}D_{core}/2\lambda_s)^2. \quad (16)$$

Figure 2:
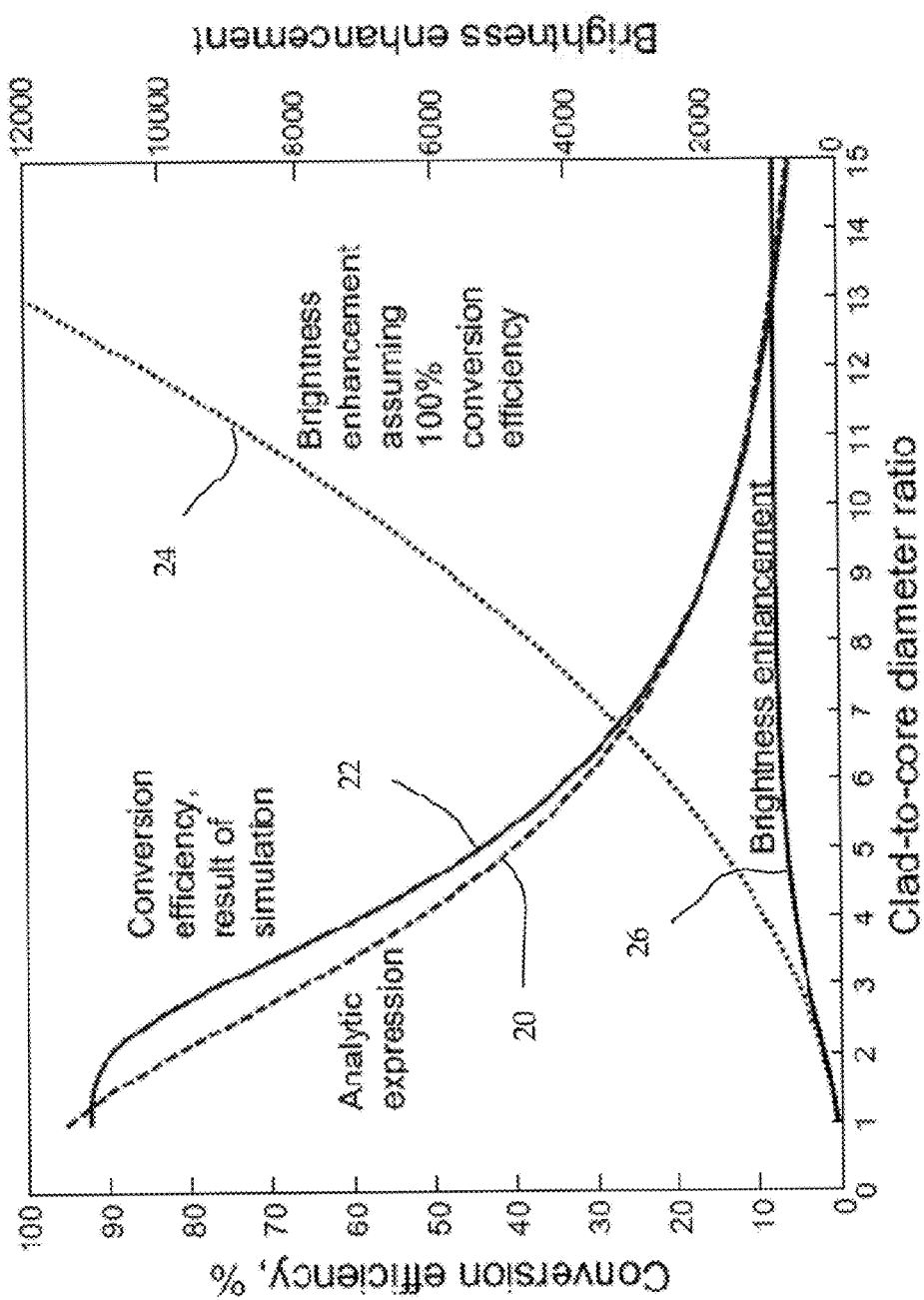
FIG. 2 shows conversion efficiency and brightness enhancement achievable for an NA ratio of 0.45:0.07 as a function of clad-to-core diameter ratio.

This result implies that making $NA_{clad}$ high and operating in a large core $D_{core}$ with a low $NA_{core}$ optimizes the achievable brightness enhancement. Practical considerations limit this brightness enhancement to about 1000×. FIG. 2 plots the brightness enhancement maximum 26 and the attainable value 24 when limited by incomplete pump depletion resulting from second order Stokes generation in the core. Here, high peak pump powers are attained with nanosecond pulses as in [2]. Note that above a clad-to-core diameter ratio of around 2, the efficiency of the Raman conversion process rolls off dramatically due to a cascade of energy to higher-order Stokes lines before complete pump depletion can occur. Again, FIG. 2 illustrates conversion efficiency and brightness enhancement achievable for an NA ratio of 0.45:0.07 as a function of clad-to-core diameter ratio. Due to incomplete pump depletion when the threshold for second order Stokes is reached in the core, the conversion efficiency is increasingly limited as the clad-to-core diameter ratio is increased. The analytic expression 20 of conversion efficiency and the simulation 22 conversion efficiency are also shown. The result of numerical simulations (solid) is compared against an approximate analytic expression given in eqn. 14. This in turn clamps the achievable brightness enhancement to the expression given in eqn. 16. Assumed parameters include a peak pump power of 50 kW, injected signal of 10 W, second-order seed 50 dB below the injected signal, and a core diameter of 20 μm.

But the potential for much higher levels of brightness enhancement exists. It is possible to suppress the onset of the Raman cascade by using a specially designed fiber waveguide (depressed well core design) that provides a differential loss between the first and second Stokes lines of the Raman process [8, 9]. This custom fiber design removes the restriction of low clad-to-core diameter ratios of 2-3 to beyond 10. This in turn permits brightness enhancement factors well in excess of 1000×. FIG. 3A shows an example waveguide design showing how a large single-mode core 30 (e.g., 14.5 μm diameter having e.g., a NA of 0.6) could be formed in an optical fiber that has a rapidly changing mode field diameter (MFD) (e.g., 34) as a function of wavelength. As the MFD moves from the region where it is relatively flat (left of about 1600 nm) to the region where it is increasing rapidly, any perturbation to the fiber such as a bend creates large optical radiation losses. A fiber such as this would have losses on the order of 10 dB/m at 1706 nm with relatively loose bends that would not induce significant losses at the signal wavelength at 1585 nm. A 1480 nm laser diode might pump this specific waveguide. However, the location of the onset of these radiation losses can be designed by changing the ratio of the diameter of the well to the diameter of the inner core. This permits the construction of a cladding-pumped Raman fiber laser that overcomes the Stokes limit over a broad range of wavelengths. The depressed well core design of FIG. 3A enables low loss at the first-order Stokes signal wavelength and high loss at the second-order Stokes parasitic wavelength.

Figure 4:
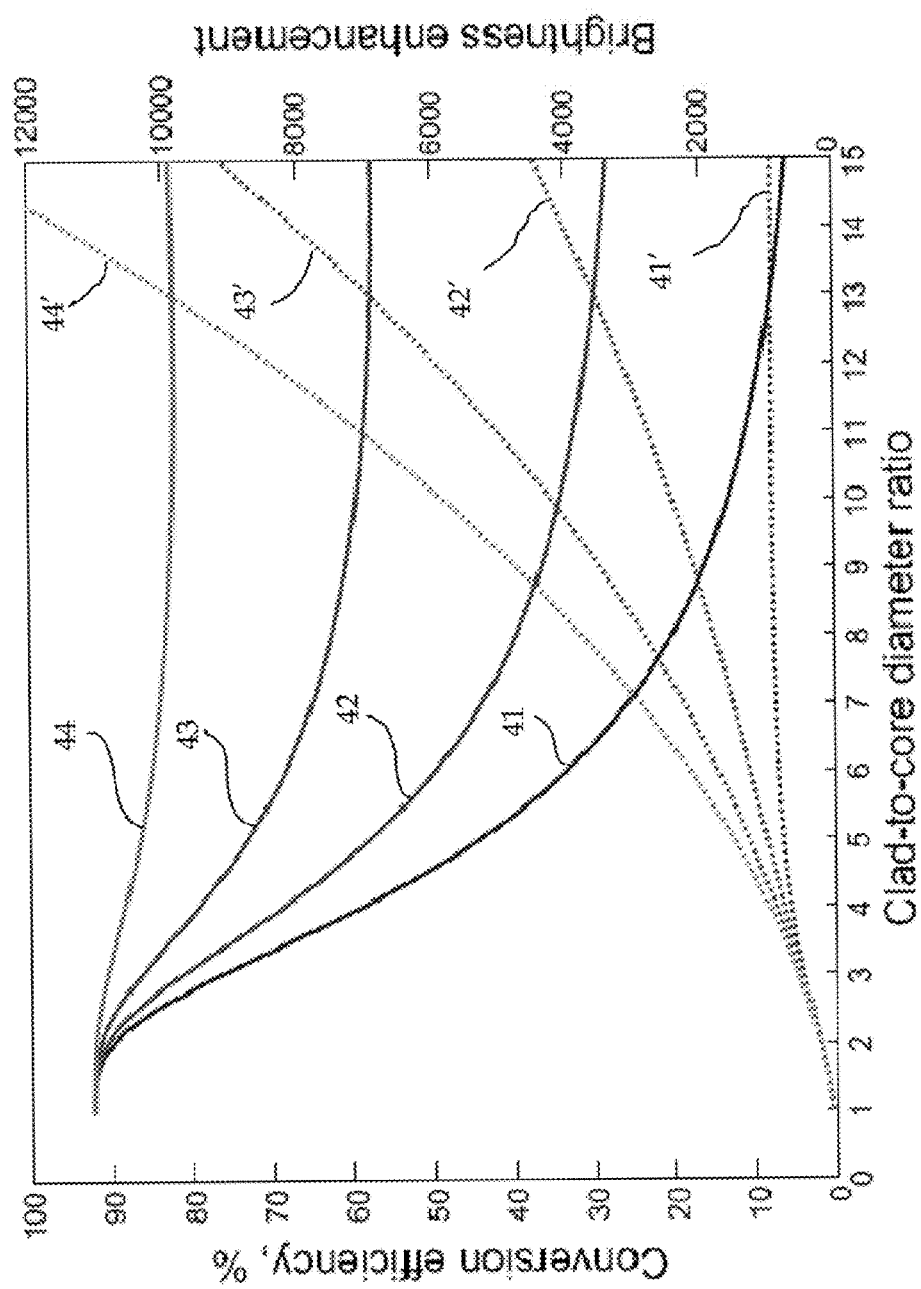
FIG. 4 shows conversion efficiency and brightness enhancement achievable for an NA ratio of 0.45:0.07 as a function of clad-to-core diameter ratio with loss at the second-order Stokes wavelength.

FIG. 4 demonstrates how implementing loss at the second-order Stokes wavelength can increase the conversion efficiency to near the quantum-defect limit and hence the achievable brightness enhancement to near the theoretical maximum governed by radiance considerations. The figure shows conversion efficiency (progressively increasing from plot 41-44) and brightness enhancement achievable (progressively increasing from 41' to 44' and corresponding to conversion efficiencies 41-44 respectively) for an NA ratio of 0.45:0.07 as a function of clad-to-core diameter ratio with loss at the second-order Stokes wavelength. Increased loss raises the second order Stokes threshold enabling quantum defect-limited conversion efficiency for losses above 10 dB/m.

We next consider the case of a cw cladding-pumped Raman fiber laser (CPRFL). Here, lower pump powers are employed but feedback ensures a longer interaction length. The model [10] consists of 4 coupled wave equations for the pump, forward and backward traveling waves at the first-order Stokes and forward traveling wave at the second-order Stokes. We assume that the end mirrors are reflective only at the first-order Stokes wavelength (selective dichroic mirrors or Bragg gratings) with a 100% reflector on one end and a variable output coupler on the other end, where:

$$\frac{dP_p}{d_z} = -\alpha_p P_p - \frac{g}{A_{clad}} \frac{v_p}{v_{s1}} (P_{s1a} + P_{s1b}) P_p, \quad (17)$$

$$\frac{dP_{s1a}}{d_z} = -\alpha_{s1} P_{s1a} + \frac{g}{A_{clad}} P_p P_{s1a} - \frac{g}{A_{core}} \frac{v_{s1}}{v_{s2}} P_{s2} + P_{s1a}, \quad (18)$$

$$\frac{dP_{s1b}}{d_z} = +\alpha_{s1} P_{s1b} - \frac{g}{A_{clad}} P_p P_{s1b} + \frac{g}{A_{core}} \frac{v_{s1}}{v_{s2}} P_{s2} + P_{s1b}, \quad (19)$$

$$\frac{dP_{s2}}{d_z} = -\alpha_{s2} P_{s2} - \frac{g}{A_{core}} (P_{s1} + P_{s1b}) P_{s2}. \quad (20)$$

Figure 5:
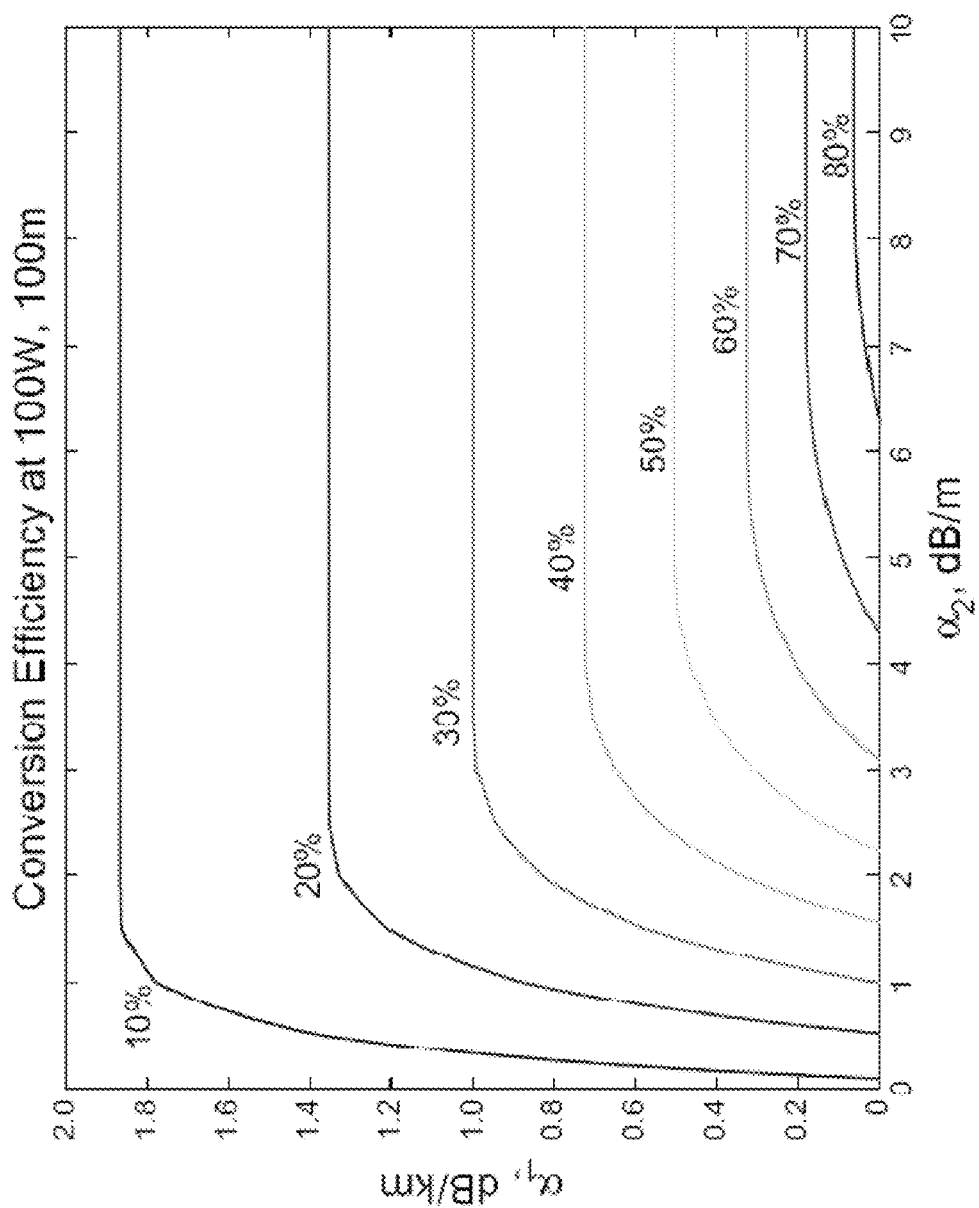
FIG. 5 shows a contour plot of the expected conversion efficiency of a continuous wave (cw) cladding-pumped Raman fiber laser when limited by signal dissipation into passive losses and second-order Stokes conversion.

These equations can be solved using a fourth order Runge-Kutta ODE solver. Self-consistent solutions are found by shooting the signal power at the 100% coupler and determining the reflectivity based on the ratio of the forward and backward going waves at the output coupler. A global optimizer can further be used to optimize output coupler reflectivity in order to maximize the output power in the first order Stokes. When an optimum is found it is generally the case that decreased reflectivity results in inefficient pump depletion while increased reflectivity results in greater intra-cavity losses. It is desirable to keep the cladding diameter small enough to maintain high signal gain but large enough to accommodate the brightness of the pump source used. Assuming a pump diode brightness at 0.021 W/($\mu m^2$-sr) mapped into in a 100 mm 0.45 NA cladding, we arrive at 100 W. Using this as a pump source for a 20 $\mu m$ MFD core, in FIG. 5 we map out the parameter space of required attenuation on the first and second order Stokes signal for efficient conversion in a 100 m fiber oscillator. This contour map defines the requirements on the differential loss in the waveguide needed to obtain a given conversion efficiency. The contour plot illustrates the expected conversion efficiency of a cw cladding-pumped Raman fiber laser when limited by signal dissipation into passive losses and second-order Stokes conversion. The contours are plotted versus losses on the first and second Stokes orders. Parameters assumed include a 100 W cw pump, 100 m fiber length, clad-to-core diameter ratio of 100:12 $\mu m$. The seed at the Stokes wavelength was assumed to be 50 dB below the pump power. Loss at the pump wavelengths is 5.2 dB/km. The bend in these curves occurs at the magnitude of second-order Stokes losses that is sufficient to suppress the runaway Stokes cascade. For an oscillator to be immune from a runaway Stokes cascade, the imposed losses on the second order Stokes need to be greater than the maximum possible Raman gain. Since the gain can occur from forward and backward traveling signal fields, this translates into the following relationship:

$$\alpha_{s2} > \frac{g P_p}{A_{core}} \frac{(1+R)}{(1-R)}. \quad (22)$$

Figure 6:
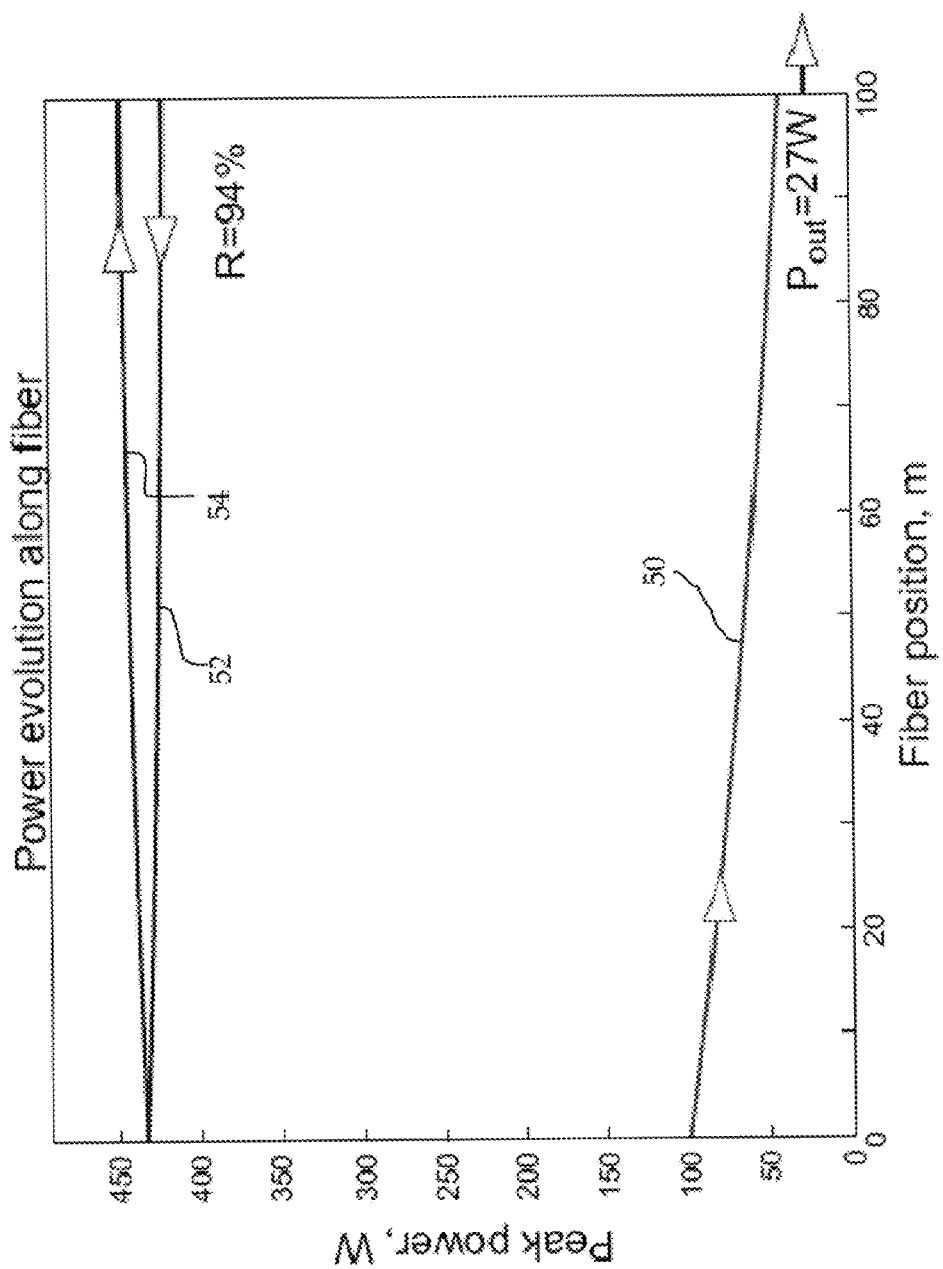
FIG. 6 shows a simulation of peak power versus fiber position for a cw cladding-pumped Raman fiber laser.

A particular solution at $\alpha_{s1}=1$ dB/km and $\alpha_{s2}=2$ db/m is plotted in FIG. 6. The output coupler reflectivities required in this regime vary from 90-95%. The reflectivity may be further increased to shorten the fiber length but this can result in a greater circulating intensity in the oscillator cavity. For high power, high conversion operation, it may be desirable to limit the reflectivity so as to practically extract the maximum amount of power and avoid damage near 20 W/$\mu m^2$. The figure is a simulation of a cw cladding-pumped Raman fiber laser with a single-pass evolution of pump, self-consistent, multi-pass evolution of the first order Stokes and single-pass evolution of second-order Stokes powers versus length. Parameters assumed include a 100 W pump, 100 m 100:12 $\mu m$ fiber, $\alpha_{s1}=1$ dB/km, and $\alpha_{s2}=2$ dB/m. At these low pump power levels (e.g., 50), high reflectivity (94%) is required, the circulating intensity is 7.4 W/$\mu m^2$, a brightness enhancement of 1060 can be achieved, but only 27% conversion is predicted. The directional peak powers versus fiber position for these parameters are shown at plots 52 and 54.

Figure 7:
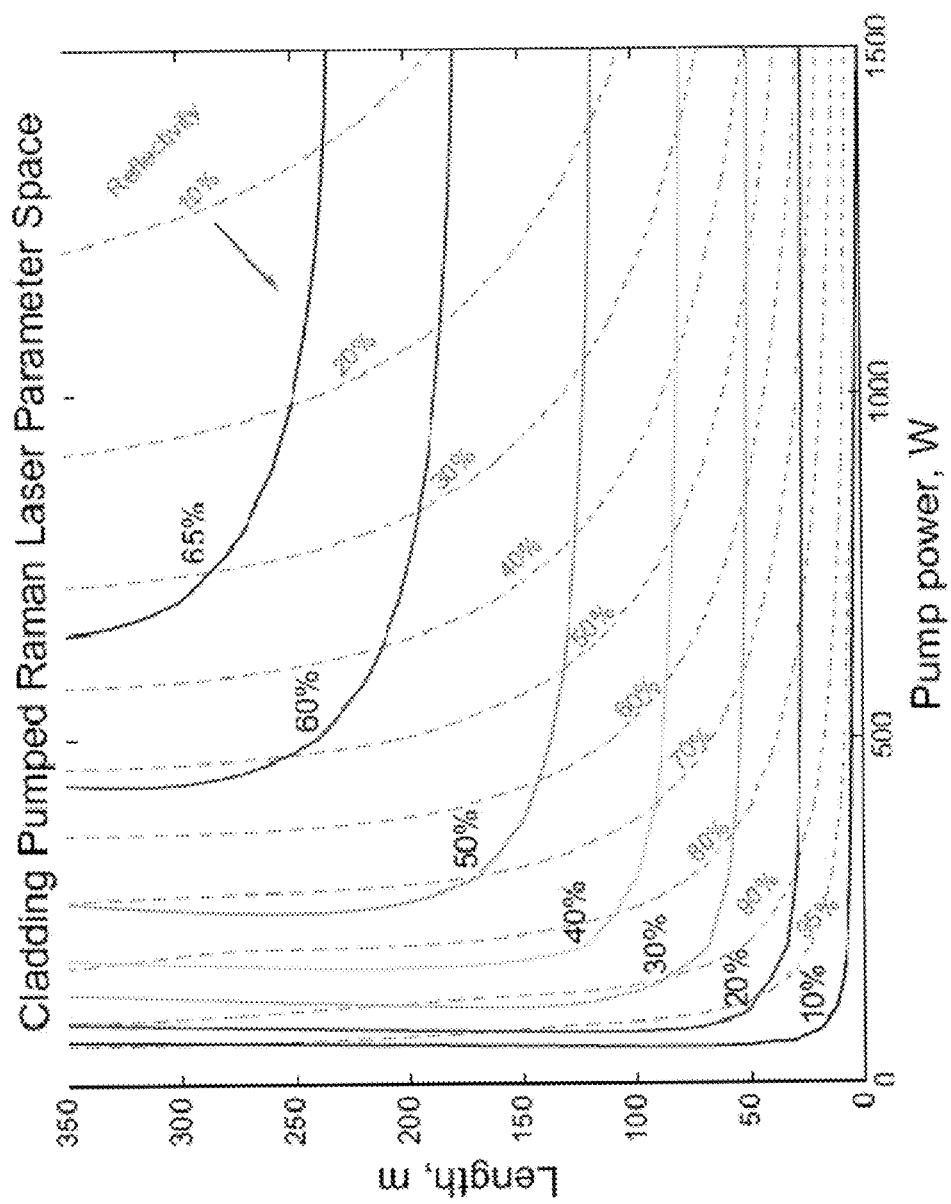
FIG. 7 is a contour plot of the expected conversion efficiency of a cw cladding-pumped Raman fiber laser when limited by second-order Stokes conversion.

FIG. 7 summarizes these tradeoffs. There are clearly identifiable regimes on this plot. For low pump powers, high reflectivities can provide enough feedback to deplete the pump, but the attenuation of the signal becomes the limiting factor on efficiency. For short fiber lengths, incomplete pump depletion becomes the limiting factor on efficiency and damage can be an issue. For powers or reflectivities higher than the optimum, the generation of second-order Stokes clamps the output power. The figure is a contour plot of the expected conversion efficiency of a cw cladding-pumped Raman fiber laser when limited by second-order Stokes conversion. The contours are plotted vs. pump power and fiber length. Also shown are the reflectivities required to optimize the oscillator output power. We assume the same clad-to-core diameter ratio seed and pump loss and fix the losses at 1 dB/km and 2 dB/m for the first and second order Stokes shifted wavelengths, respectively.

Figure 8:
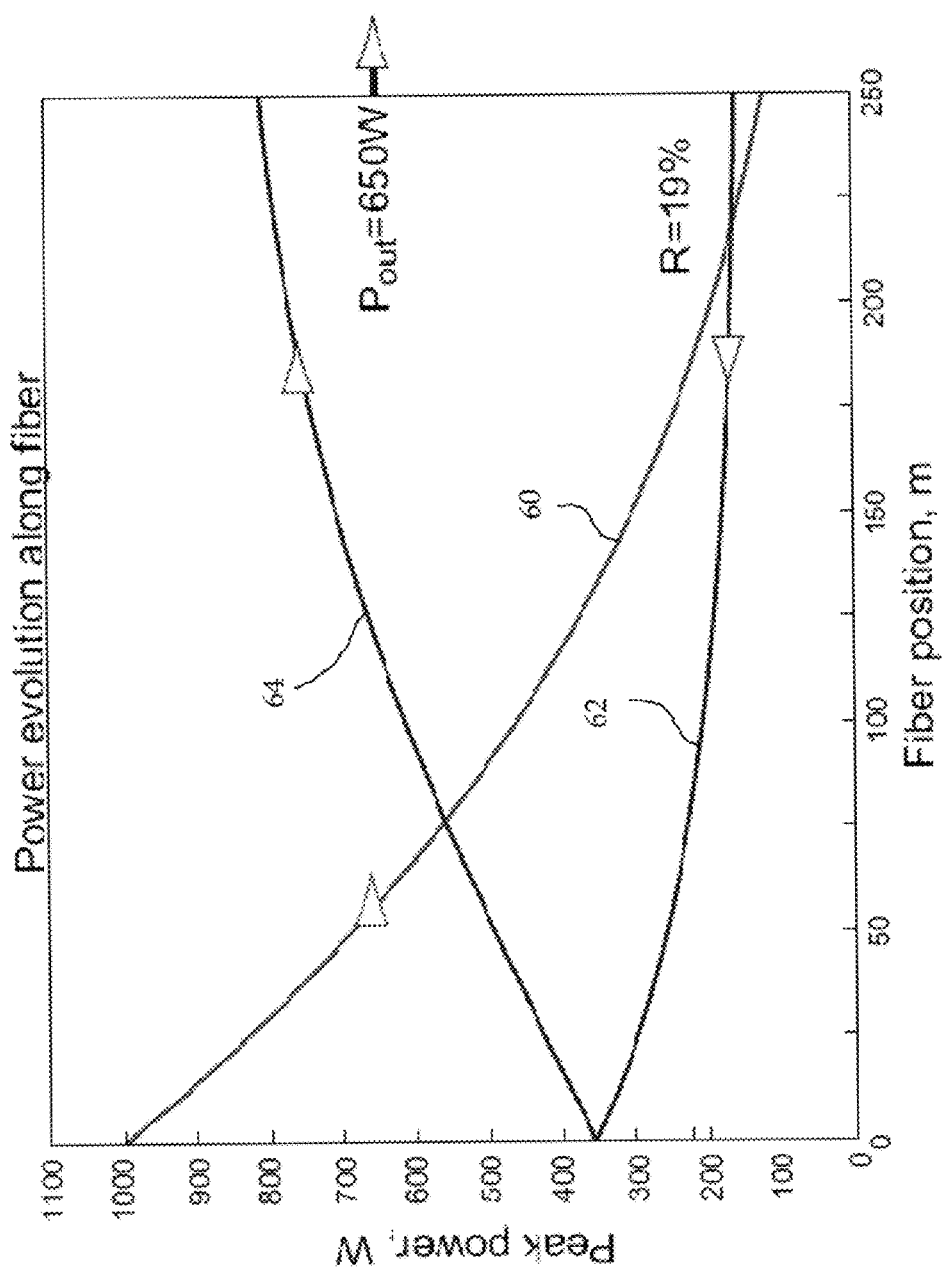
FIG. 8 is a simulation of a cw cladding-pumped Raman fiber laser with a single-pass evolution of pump, self-consistent, multi-pass evolution of the first order Stokes and single-pass evolution of second-order Stokes powers versus length.

Another particular solution at $\alpha_{s1}=1$ dB/km, $\alpha_{s2}=2$ bB/m, P=1 kW in a 250 m fiber is plotted in FIG. 8. In this aggressively pumped regime, less reflectivity is required and 65% conversion efficiency is predicted with a brightness enhancement >2600. Higher levels of cw brightness enhancement may be possible with higher damage thresholds, lower signal attenuation, or larger cores. The figure shows a simulation of a cw cladding-pumped Raman fiber laser with a single-pass evolution of pump (e.g., 60), self-consistent, multi-pass evolution of the first order directional Stokes (e.g., 64, 62) with a single-pass evolution of second-order Stokes powers versus length. Parameters assumed include a 1 kW pump, 250 m 100:12 $\mu m$ fiber, $\alpha_{s1}=1$ dB/km, and $\alpha_{s2}=2$ dB/m. At these higher pump power levels, modest reflectivity (19%) is required, the circulating intensity is 2.8 W/$\mu m^2$, a brightness enhancement of 2600 can be achieved, and 65% conversion is predicted.

Care must also be taken to ensure that signal light remains in the core and does not leak into the cladding where it can also be amplified, robbing pump power and spoiling the output mode quality. This can result from imperfect coupling with an external bulk dichroic mirror. A better solution employs Bragg gratings written into the core.

Figure 9B:
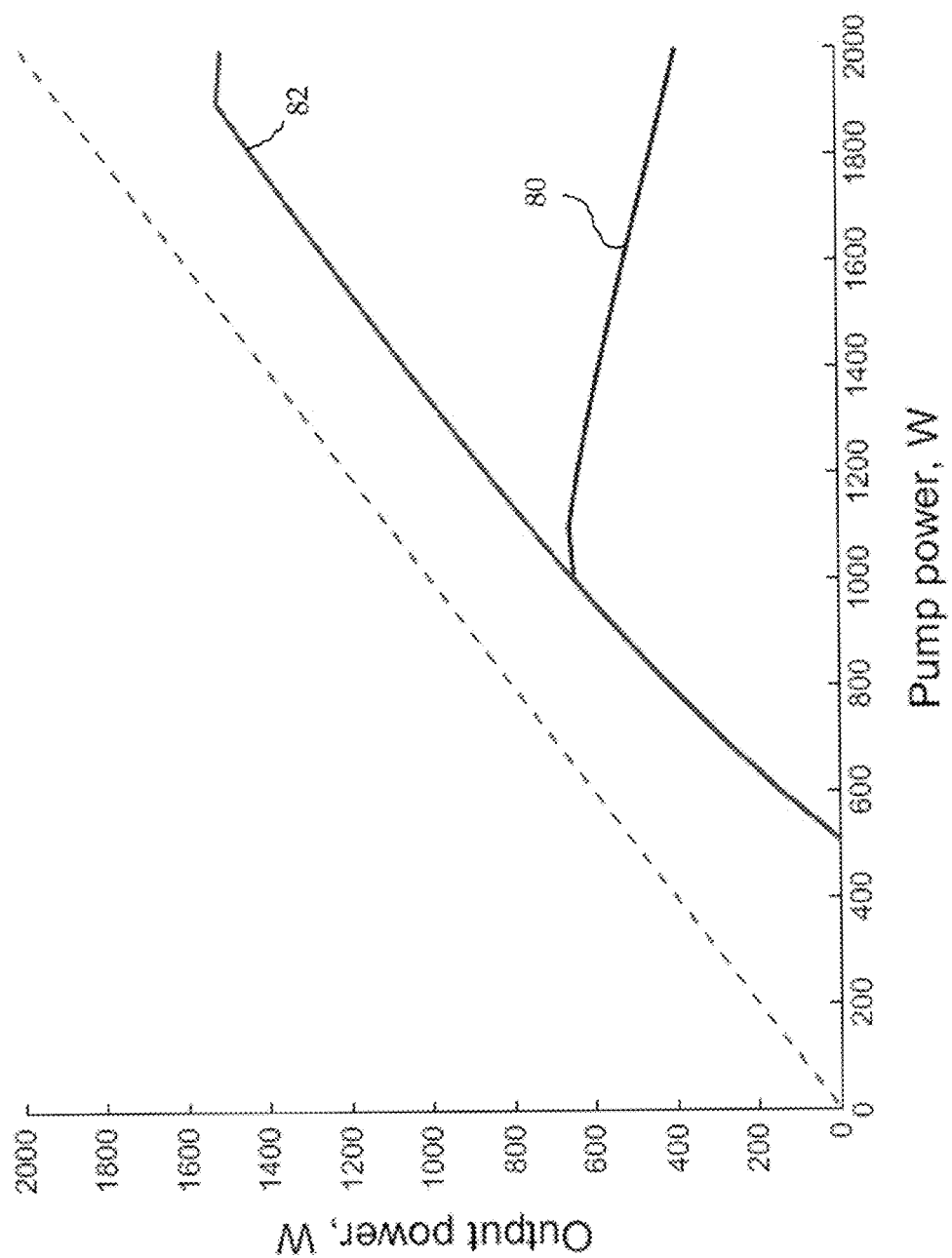

In an examination of the relationship between input and output power, FIGS. 9A and 9B show the curves for 100 m oscillators with 94% and 19% reflectivities, respectively, for $\alpha_{s2}=2$ dB/m (e.g., 70 in FIGS. 9A and 80 in FIG. 9B) and 5 dB/m (e.g., 72 in FIGS. 9A and 82 in FIG. 9B). Because the oscillator is not resonant at second-order Stokes wavelengths, there is a clamping of output power. The power curves can be parameterized by a threshold, asymptotic slope efficiency and the clamped output power. The threshold is determined by the fiber length and reflectivity required for oscillation: $(A_{clad}/g)[\alpha_{s1}-\ln(R)/2L]$. Initially at threshold, the slope efficiency can be larger than the asymptotic slope efficiency and even exceed unity. It however eventually approaches a slope efficiency limited by signal losses and quantum defect. Clamped output power is limited by the threshold for second-order Stokes in eqn. 22. The power input-output relationships, for 100 m and 250 m cladding-pumped Raman fiber lasers with 94% and 19% reflectivities, are for $\alpha_{s2}$=2.5 dB/m.

Figure 10:
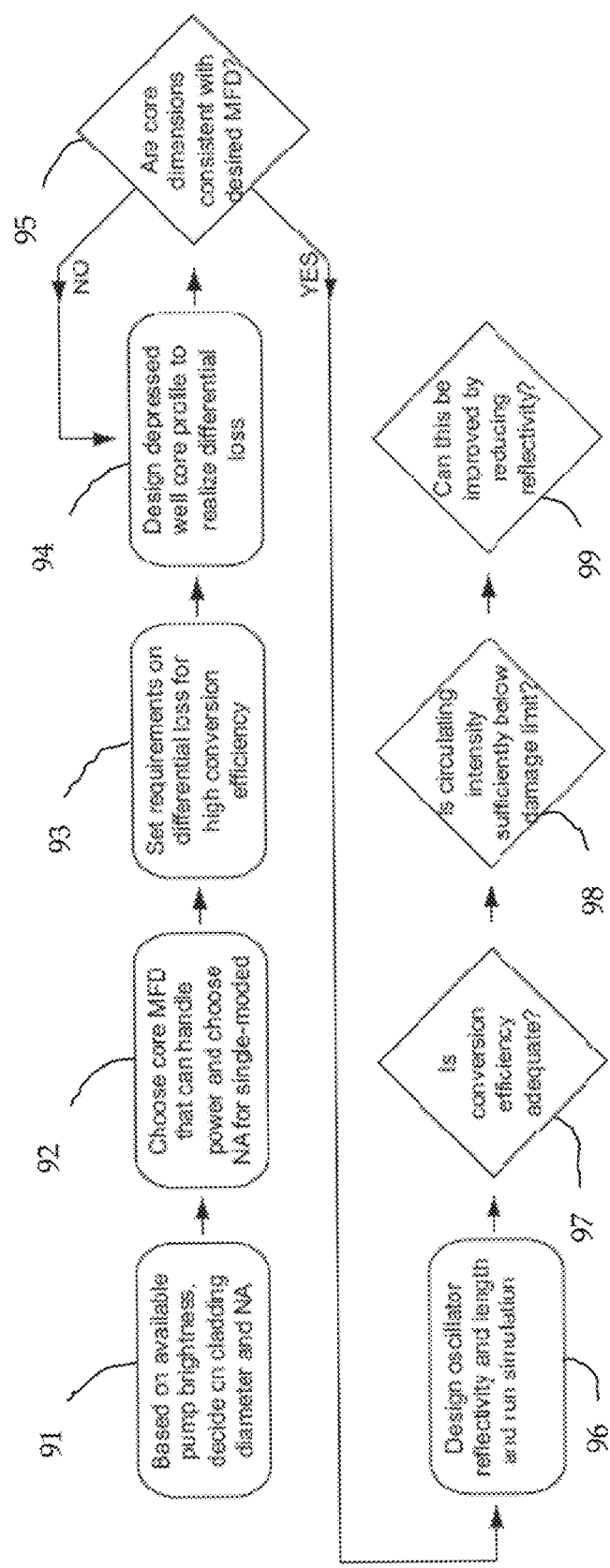
FIGS. 10-12 respectively show a flowchart useful as a guide to designing cladding-pumped Raman fiber lasers, an embodiment of a 4 by 10 W diode pump array for supplying pump light through a lens duct and combiner to a 125/20 μm undoped cladding fiber having Bragg mirrors written into the core and an embodiment of a cladding pumped Raman fiber amplifier.
Figure 11:
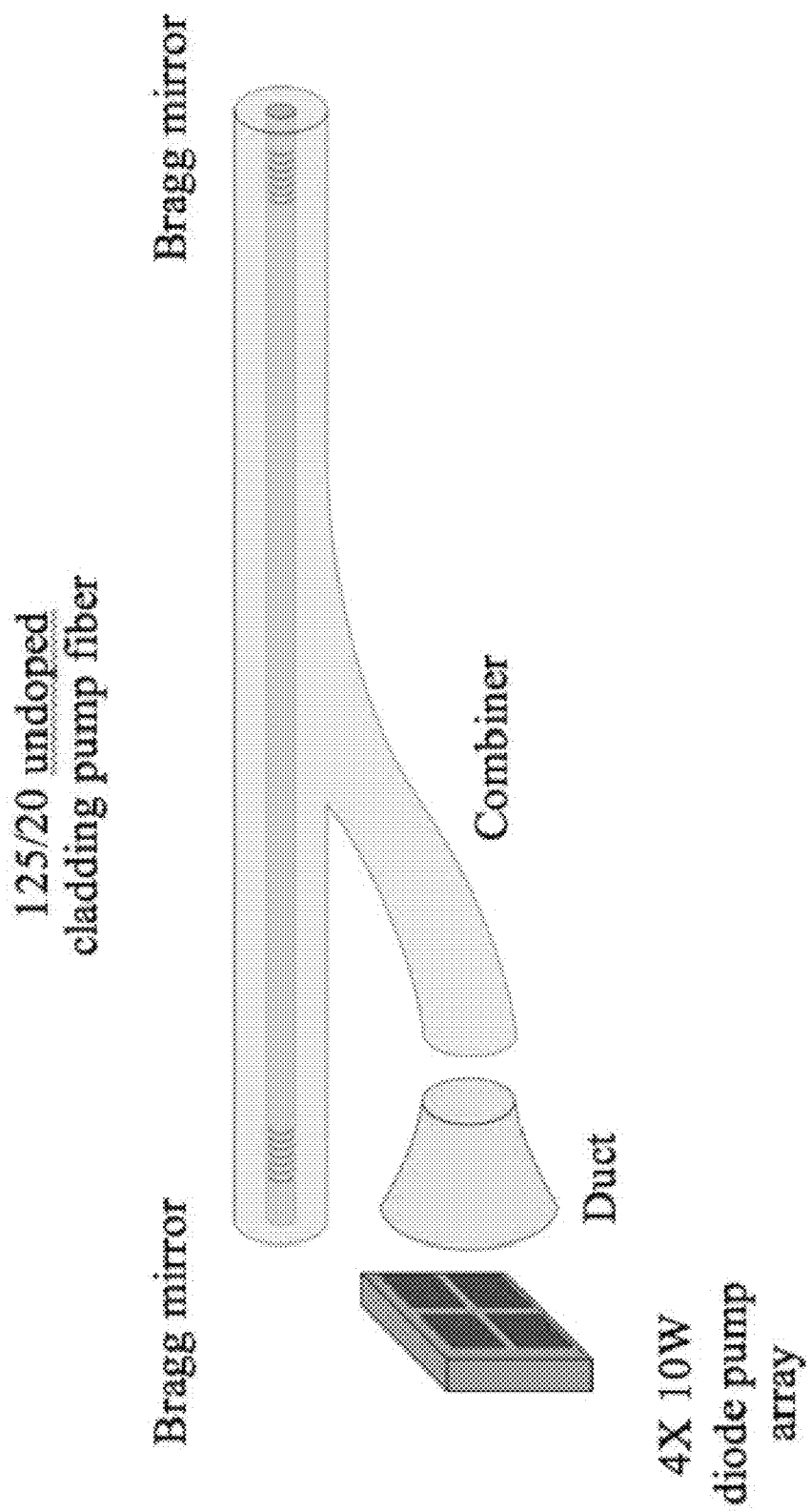
Figure 12:
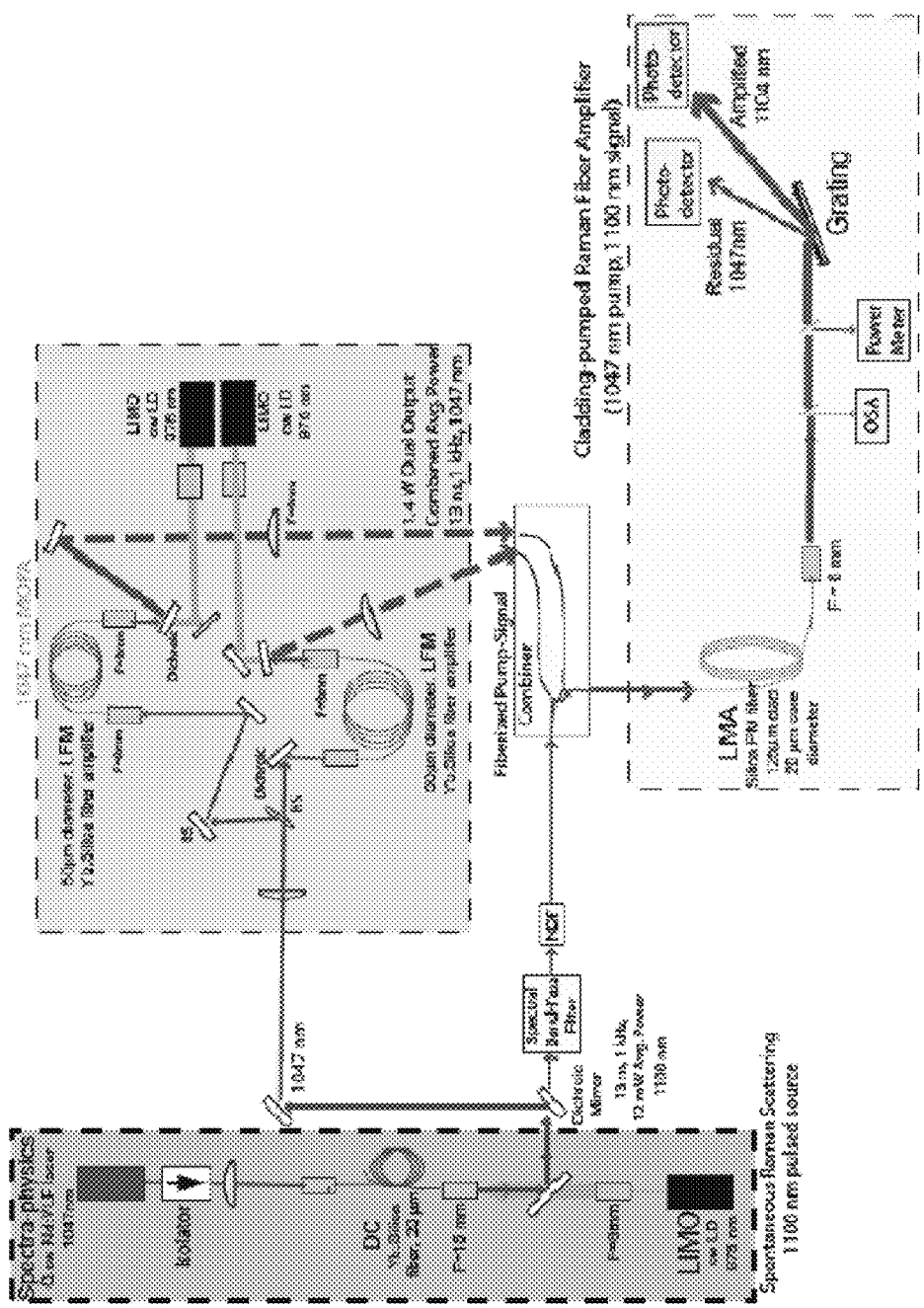

FIGS. 10-12 respectively show a flowchart useful as a guide to designing cladding-pumped Raman fiber lasers, an embodiment of a 4 by 10 W diode pump array for supplying pump light through a lens duct and combiner to a 125/20 μm undoped cladding fiber having Bragg mirrors written into the core and an embodiment of a cladding pumped Raman fiber amplifier. Proper oscillator design requires specification of at least parameters: pump power, clad diameter, clad NA, core diameter, core NA, signal loss, $2^{nd}$ order Stokes loss, fiber length and output coupler reflectivity. The dependence of conversion efficiency and damage fraction on these parameters is complicated. In the spirit of simplifying this, we present a design methodology in FIG. 10. This flowchart is useful as a guide to designing cladding-pumped Raman fiber lasers. Based on available pump brightness, cladding diameter and NA are decided (step 91). Core MFD that can handle power and NA for the case of a single-mode fiber are decided (step 92). The requirements on differential loss for high conversion efficiency are chosen (step 93). A depressed well core profile to realize the chosen differential loss is designed (step 94). If the core dimensions are not consistent with desired MID (step 95), step 94 is repeated. If they are consistent, the oscillator reflectivity and length are designed and the simulation is run (step 96). If conversion efficiency is adequate (step 97) and circulating intensity is sufficiently improved by reducing reflectivity (step 99) the process is complete. Otherwise, process steps are repeated. FIG. 11 shows a 4×10 W diode pump array 200, a lens duct 202, a combiner 204, and an undoped cladding pump fiber 206 having Bragg mirrors 208 and 210 at each end of the fiber 206. FIG. 206 includes a cladding 212 and an undoped core 214.

Accordingly, embodiments of the invention comprise an apparatus (and method of using such an apparatus) including a fiber optic having a core and a cladding surrounding the core; and means for optically pumping the cladding to produce stimulated Raman scattering comprising a first order Stokes line and at least one higher order Stokes line, wherein the core comprises means for suppressing the at least one higher order Stokes line. The means for suppressing the at least one higher order Stokes line comprises an optical waveguide design. The optical waveguide design can utilize optical waveguide loss at one or more wavelengths at which the at least one higher order Stokes lines occurs to provide suppression of the at least one higher order Stokes lines. The optical waveguide loss is selected to suppress the onset of a Raman cascade. The means for suppressing the at least one higher order Stokes line comprises a depressed well core design in the core. The means for suppressing the at least one higher order Stokes line is selected to provide a differential loss between the first order Stokes line and the at least one higher order Stokes line. A feedback mechanism can be used and it is configured to reflect the first order Stokes line within the fiber optic. The feedback mechanism can comprise at least one mirror, at least one Bragg grating written into the fiber optic and written into the core. The fiber optic is configured to use Raman scattering as a gain media. The fiber optic can comprise a resonant cavity configured to resonate at the wavelength of the first order Stokes line. The resonant cavity is often formed by two Bragg gratings written into the core. The core can often comprise substantially no rare earth dopant, but can alternately include such dopants. The clad to core diameter ratio can be greater than 3 and range to higher than 10. The means for suppressing the at least one higher order Stokes line can impose losses on the at least one higher order Stokes line, wherein the losses are greater than the maximum possible Raman gain achievable in the fiber optic. The fiber optic can comprise a resonant cavity configured to resonate at the wavelength of the first order Stokes line, wherein loss at the first order Stokes line ($\alpha_{s1}$) is low enough to ensure that Raman gain (g) can compensate this loss taking into account the output coupled light in a fiber oscillator with reflectivity R, length L, and cladding area, $A_{clad}$, where, e.g., $$\alpha_{s1} < \frac{gP_p}{A_{clad}} + \frac{\ln R}{2L},$$

where $P_p$ is the amount of pump power pumped into the cladding by the means for optically pumping the cladding. The fiber optic can comprise a resonant cavity configured to resonate at the wavelength of the first order Stokes line, where $$\alpha_{s1} < \frac{gP_p}{A_{clad}} + \frac{\ln R}{2L},$$

wherein $\alpha_{s1}$ is loss at the first order Stokes line, g is Raman gain, R is reflectivity, L is length, $A_{clad}$ is cladding area and $P_p$ is the amount of pump power pumped into the cladding by the means for optically pumping the cladding. The slope efficiency can be $S=Qe^{(-\alpha_1 L/(1-R))}$ where Q is quantum efficiency. The amount of output power at the first order Stokes line divided by the amount of pump power pumped into the cladding can be greater than 50%. The amount of output power at the first order Stokes line divided by the amount of pump power pumped into the cladding can be within a range selected from a group consisting of (i) greater than 50% to 85%, (ii) greater than 50% to the quantum efficiency and (iii) greater than 85% to the quantum efficiency. The means for optically pumping the cladding can provide a pump beam wherein the cladding guides the pump beam substantially through the entire length of the fiber optic.

REFERENCES

Incorporated Herein by Reference

1. C. A. Codemard, P. Dupriez, Y. Jeong, J. K. Sahu, M. Ibsen, and J. Nilsson, "High-power continuous-wave cladding-pumped Raman fiber laser," Opt. Lett. 31, 2290-2292 (2006).
2. A. K. Sridharan, J. E. Heebner, M. J. Messerly, J. W. Dawson, R. J. Beach, and C. P. J. Barty, "Brightness enhancement in a high-peak-power cladding-pumped Raman fiber amplifier," Opt. Lett. 34, 2234-2236 (2009).
3. Y Emori and S. Namiki, "100 nm bandwidth flat gain Raman amplifiers pumped and gain-equalized by 12-wavelength-channel WDM high power laser diodes," OFC, PD19 (1999).
4. C. Headley and G. P. Agrawal, *Raman Amplification in Fiber Optical Communication Systems* (Academic Press, Amsterdam, 2004).

5. G. P. Agrawal, *Nonlinear Fiber optics* 3rd ed. San Diego, Calif. (Academic Press, Amsterdam, 2001).
6. R. G. Smith, "Optical power handling capacity of low loss optical fibers as determined by stimulated Raman and Brillouin scattering," Appl. Opt. 11, 2489-2494 (1972).
7. J. Ji, C. A. Codemard, M. Ibsen, J. K. Sahu, and J. Nilsson, "Analysis of the conversion to the first stokes in cladding-pumped fiber raman amplifiers," IEEE J. Selected Topics in Quantum Electronics, 15, 129-139 (2009).
8. G. L. Keaton, M. A. Arbore, T. J. Kane, "Optical wavelength filtering apparatus with depressed index claddings," U.S. Pat. No. 6,563,995 (2001).
9. J. Kim, P. Dupriez, C. Codemard, J. Nilsson, and J. K. Sahu, "Suppression of stimulated Raman scattering in a high power Yb-doped fiber amplifier using a W-type core with fundamental mode cut-off," Opt. Express 14, 5103-5113 (2006).
10. J. AuYeung and A. Yariv, "Theory of cw Raman oscillation in optical fibers," J. Opt. Soc. Am. 69, 803-807 (1979).
11. J. Nilsson, J. K. Sahu, J. N. Jang, R. Selvas, D. C. Hanna, and A. Grudinin, "Optical Device with Immediate Gain for Brightness Enhancement of Optical Pulses," U.S. Pat. No. 10,024,716 (2005).
12. R. Rice, "Multimode Raman fiber amplifier and method," U.S. Pat. No. 6,363,087 (2002).
13. C. A. Codemard, J. K. Sahu, and J. Nilsson, "High-brightness, pulsed, cladding-pumped Raman fiber source at 1660 nm," in *Conference on Lasers and Electro-Optics*, (Optical Society of America, 2007).
14. C. A. Codemard, J. K. Sahu, and J. Nilsson, "Cladding pumped Raman fiber amplifier for high-gain, high energy single-stage amplification," in *Optical Fiber Communications Technical Digest* (Institute of Electrical and Electronics Engineers, 2005).
15. J. W. Dawson, M. J. Messerly, R. J. Beach, M. Y. Shverdin, E. A. Stappaerts, A. K. Sridharan, P. H. Pax, J. E. Heebner, C. W. Siders, and C. P. J. Barty, "Analysis of the scalability of diffraction-limited fiber lasers and amplifiers to high average power," Opt. Express 16, 13240-13266 (2008).
16. A. K. Sridharan, P. H. Pax, M. J. Messerly, and J. W. Dawson, "High-gain photonic crystal fiber regenerative amplifier," Opt. Lett. 34, 608-610 (2009).

The foregoing description of the invention has been presented for purposes of illustration and description and is not intended to be exhaustive or to limit the invention to the precise form disclosed. Many modifications and variations are possible in light of the above teaching. For example, FIG. 11 shows an embodiment of a 4 by 10 W diode pump array for supplying pump light through a lens duct and combiner to a 125/20 µm undoped cladding fiber having Bragg mirrors written into the core. FIG. 12 shows an embodiment of a cladding pumped Raman fiber amplifier. The embodiments disclosed throughout this disclosure were meant only to explain the principles of the invention and its practical application to thereby enable others skilled in the art to best use the invention in various embodiments and with various modifications suited to the particular use contemplated. The scope of the invention is to be defined by the following claims.

We claim:

1. An apparatus, comprising:
    a fiber optic having a core and a cladding surrounding said core, wherein said core comprises no rare earth dopant; and
    means for optically pumping said cladding to produce stimulated Raman scattering comprising a first order Stokes line and at least one higher order Stokes line, wherein said core comprises means for introducing a differential loss between said first order Stokes line and said at least one higher order Stokes line to suppress said at least one higher order Stokes line and amplify said first order Stokes line.

2. The apparatus of claim 1, wherein said means for introducing a differential loss comprises an optical waveguide design.

3. The apparatus of claim 2, wherein said optical waveguide design utilizes optical waveguide loss at one or more wavelengths at which said at least one higher order Stokes line occurs to provide suppression of said at least one higher order Stokes line.

4. The apparatus of claim 3, wherein said optical waveguide loss is selected to suppress the onset of a Raman cascade.

5. The apparatus of claim 1, wherein said means for introducing a differential loss comprises a depressed well core design in said core.

6. The apparatus of claim 1, further comprising a feedback mechanism configured to reflect said first order Stokes line within said fiber optic.

7. The apparatus of claim 6, wherein said feedback mechanism comprises at least one mirror.

8. The apparatus of claim 6, wherein said feedback mechanism comprises at least one Bragg grating.

9. The apparatus of claim 8, wherein said Bragg grating is written into said fiber optic.

10. The apparatus of claim 8, wherein said Bragg grating is written into said core.

11. The apparatus of claim 1, wherein said fiber optic is configured to use Raman scattering as a gain media.

12. The apparatus of claim 1, wherein said fiber optic comprises a resonant cavity configured to resonate at the wavelength of said first order Stokes line.

13. The apparatus of claim 12, wherein said resonant cavity is formed by two Bragg gratings written into said core.

14. The apparatus of claim 1, wherein the clad to core diameter ratio is greater than 3.

15. The apparatus of claim 1, wherein said means for introducing a differential loss imposes losses on said at least one higher order Stokes line, wherein said losses are greater than the maximum possible Raman gain achievable in said fiber optic.

16. The apparatus of claim 1, wherein said fiber optic comprises a resonant cavity configured to resonate at the wavelength of said first order Stokes line, wherein loss at said first order Stokes line ($\alpha_{s1}$) is low enough to ensure that Raman gain (g) can compensate this loss taking into account the output coupled light in a fiber oscillator with reflectivity R, length L, and cladding area, $A_{clad}$.

17. The apparatus of claim 16, wherein slope efficiency is $S=Qe^{(-\alpha_{s1}L/(1-R))}$, where Q is quantum efficiency.

18. The apparatus of claim 1, wherein the amount of output power at said first order Stokes line divided by the amount of pump power pumped into said cladding is greater than 50%.

19. The apparatus of claim 1, wherein the amount of output power at said first order Stokes line divided by the amount of pump power pumped into said cladding is within a range selected from a group consisting of (i) greater than 50% to 85%, (ii) greater than 50% to the quantum efficiency and (iii) greater than 85% to the quantum efficiency.

20. The apparatus of claim 1, wherein said means for optically pumping said cladding provides a pump beam, wherein said cladding guides said pump beam through the entire length of said fiber optic.

21. A method, comprising:
providing a fiber optic having a core and a cladding surrounding said core, wherein said core comprises no rare earth dopant; and
optically pumping said cladding to produce stimulated Raman scattering comprising a first order Stokes line and at least one higher order Stokes line, wherein said core comprises means for introducing a differential loss between said first order Stokes line and said at least one higher order Stokes line to suppress said at least one higher order Stokes line and amplify said first order Stokes line.

22. The method of claim 21, wherein said means for introducing a differential loss comprises an optical waveguide design.

23. The method of claim 22, wherein said optical waveguide design utilizes optical waveguide loss at one or more wavelengths at which said at least one higher order Stokes line occurs to provide suppression of said at least one higher order Stokes line.

24. The method of claim 23, wherein said optical waveguide loss is selected to suppress the onset of a Raman cascade.

25. The method of claim 21, wherein said means for introducing a differential loss comprises a depressed well core design in said core.

26. The method of claim 21, further comprising a feedback mechanism configured to reflect said first order Stokes line within said fiber optic.

27. The method of claim 26, wherein said feedback mechanism comprises at least one mirror.

28. The method of claim 26, wherein said feedback mechanism comprises at least one Bragg grating.

29. The method of claim 28, wherein said Bragg grating is written into said fiber optic.

30. The method of claim 28, wherein said Bragg grating is written into said core.

31. The method of claim 21, wherein said fiber optic is configured to use Raman scattering as a gain media.

32. The method of claim 21, wherein said fiber optic comprises a resonant cavity configured to resonate at the wavelength of said first order Stokes line.

33. The method of claim 32, wherein said resonant cavity is formed by two Bragg gratings written into said core.

34. The method of claim 21, wherein the clad to core diameter ratio is greater than 3.

35. The method of claim 21, wherein said means for introducing a differential loss imposes losses on said at least one higher order Stokes line, wherein said losses are greater than the maximum possible Raman gain achievable in said fiber optic.

36. The method of claim 21, wherein said fiber optic comprises a resonant cavity configured to resonate at the wavelength of said first order Stokes line, wherein loss at said first order Stokes line ($\alpha_{s1}$) is low enough to ensure that Raman gain (g) can compensate this loss taking into account the output coupled light in a fiber oscillator with reflectivity R, length L, and cladding area, $A_{clad}$.

37. The method of claim 21, wherein slope efficiency is $S=Qe^{(-\alpha_{s1}L/(1-R))}$, where Q is quantum efficiency.

38. The method of claim 21, wherein the amount of output power at said first order Stokes line divided by the amount of pump power pumped into said cladding is greater than 50%.

39. The method of claim 21, wherein the amount of output power at said first order Stokes line divided by the amount of pump power pumped into said cladding is within a range selected from a group consisting of (i) greater than 50% to 85%, (ii) greater than 50% to the quantum efficiency and (iii) greater than 85% to the quantum efficiency.

40. The method of claim 21, wherein said means for optically pumping said cladding provides a pump beam, wherein said cladding guides said pump beam through the entire length of said fiber optic.

* * * * *